United States Patent
McClain et al.

(10) Patent No.: US 10,489,064 B2
(45) Date of Patent: Nov. 26, 2019

(54) SYSTEMS, METHODS, AND DEVICES FOR USER CONFIGURABLE WEAR LEVELING OF NON-VOLATILE MEMORY

(71) Applicant: Cypress Semiconductor Corporation, San Jose, CA (US)

(72) Inventors: Mark Alan McClain, San Diego, CA (US); Willy Obereiner, San Jose, CA (US); Rainer Hoehler, Colorado Springs, CO (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/388,892

(22) Filed: Dec. 22, 2016

(65) Prior Publication Data

US 2018/0095678 A1    Apr. 5, 2018

Related U.S. Application Data

(60) Provisional application No. 62/403,340, filed on Oct. 3, 2016.

(51) Int. Cl.
*G06F 3/06* (2006.01)
*G06F 12/02* (2006.01)

(52) U.S. Cl.
CPC ............ *G06F 3/0616* (2013.01); *G06F 3/064* (2013.01); *G06F 3/0644* (2013.01); *G06F 3/0649* (2013.01); *G06F 3/0653* (2013.01); *G06F 3/0679* (2013.01); *G06F 3/0688* (2013.01); *G06F 12/0246* (2013.01); *G06F 2212/1041* (2013.01); *G06F 2212/7201* (2013.01); *G06F 2212/7211* (2013.01)

(58) Field of Classification Search
CPC ...... G06F 12/0646–12/0692; G06F 2212/7211
See application file for complete search history.

(56) References Cited

U.S. PATENT DOCUMENTS

| | | | |
|---|---|---|---|
| 6,850,443 B2 | 2/2005 | Lofgren et al. | |
| 7,710,777 B1 * | 5/2010 | Montierth | G11C 16/10 365/185.09 |
| 8,842,472 B2 | 9/2014 | Kim | |

(Continued)

OTHER PUBLICATIONS

Gal et al. "Algorithms and Data Structures for Flash Memories." Jun. 2005. ACM. ACM Computing Surveys. vol. 37. pp. 138-163.*

(Continued)

*Primary Examiner* — Nathan Sadler

(57) ABSTRACT

Disclosed herein are systems, methods, and devices for user configurable wear leveling of non-volatile memory devices. Devices include a non-volatile memory including a plurality of physical memory portions, where each of the plurality of physical memory portions is configured to be mapped to a logical memory portion of a plurality of logical memory portions. Devices may also include wear leveling control circuitry configured to receive a plurality of wear leveling parameters, and further configured to determine a plurality of wear leveling characteristics based on the plurality of wear leveling parameters received, where the plurality of wear leveling characteristics identify an amount of wear leveling allowed for each of the plurality of logical memory portions.

17 Claims, 6 Drawing Sheets

(56) References Cited

U.S. PATENT DOCUMENTS

| | | | |
|---|---|---|---|
| 8,902,669 B2 | 12/2014 | Yang et al. | |
| 8,995,197 B1 | 3/2015 | Steiner et al. | |
| 9,015,537 B2 | 4/2015 | Griffin et al. | |
| 9,123,422 B2 | 9/2015 | Yu et al. | |
| 2006/0282610 A1* | 12/2006 | Dariel | G06F 3/0616 711/103 |
| 2007/0174549 A1* | 7/2007 | Gyl | G06F 12/0646 711/115 |
| 2011/0066792 A1* | 3/2011 | Shaeffer | G06F 12/0246 711/103 |
| 2013/0036253 A1* | 2/2013 | Baltar | G06F 12/0246 711/103 |
| 2014/0075100 A1* | 3/2014 | Kaneko | G06F 11/008 711/103 |
| 2015/0169443 A1* | 6/2015 | Lee | G06F 12/0253 711/103 |
| 2015/0301936 A1* | 10/2015 | Matsui | G06F 12/0246 711/103 |
| 2016/0179602 A1 | 6/2016 | Gorobets et al. | |
| 2017/0046272 A1* | 2/2017 | Farmahini-Farahani | G06F 12/1009 |
| 2018/0210828 A1* | 7/2018 | Zhou | G06F 3/06 |

OTHER PUBLICATIONS

Linux Information Project. "Superblock Definition." Aug. 2005. http://www.linfo.org/superblock.*

Dew Associates. "The Master Boot Record (MBR) and Why it is Necessary?" May 2009. https://eecs.wsu.edu/~sshaikot/docs/Other/master_boot_record.pdf/ (Year: 2009).*

Chang, Li-Pin, "On Efficient Wear Leveling for Large-Scale Flash-Memory Storage Systems", SAC'07, Seoul, Korea, dated Mar. 15, 2007; 5 pages.

Ching-Che Chung, et al., "A high-performance wear-leveling algorithm for flash memory system", IEICE Electronics Express, vol. 9, No. 24 dated Dec. 28, 2012; 7 pages.

Micron Technology, Inc., "Wear Leveling in Micron NAND Flash Memory", Technical Note TN-29-61, 2011; 5 pages.

International Search Report for International Application No. PCT/US17/46142 dated Sep. 1, 2017; 4 pages.

Written Opinion of the International Searching Authority for International Application No. PCT/US17/46142 dated Sep. 1, 2017; 7 pages.

* cited by examiner

SYSTEMS, METHODS, AND DEVICES FOR USER CONFIGURABLE WEAR LEVELING OF NON-VOLATILE MEMORY

CROSS-REFERENCE TO RELATED APPLICATIONS

This application claims the benefit under 35 U.S.C. § 119(e) of U.S. Provisional Patent Application No. 62/403,340, filed on Oct. 3, 2016, which is incorporated by reference herein in its entirety for all purposes.

TECHNICAL FIELD

This disclosure generally relates to non-volatile memories and, more specifically, to wear leveling associated with non-volatile memories.

BACKGROUND

Non-volatile memory devices include memory cell arrays that may be configured as a memory component that stores data values for access by various other components of a system. Memory cells may include memory elements that may degrade over time, by retaining valid data for less time, as the cells experience an increased number of program and erase operations (PE cycles). Such memory cells may include physical storage locations grouped in physical sectors that are mapped to logical addresses and sectors that represent the memory space of the memory cell array. Wear leveling may be implemented to change a physical location of data and spread wear from PE cycles across several physical sectors. However, such wear leveling may also move less frequently cycled data to physical sectors that have already experienced numerous PE cycles. Accordingly, wear leveling techniques may inadvertently reduce the retention time of data that rarely experiences PE cycles.

DETAILED DESCRIPTION

Figure 1:
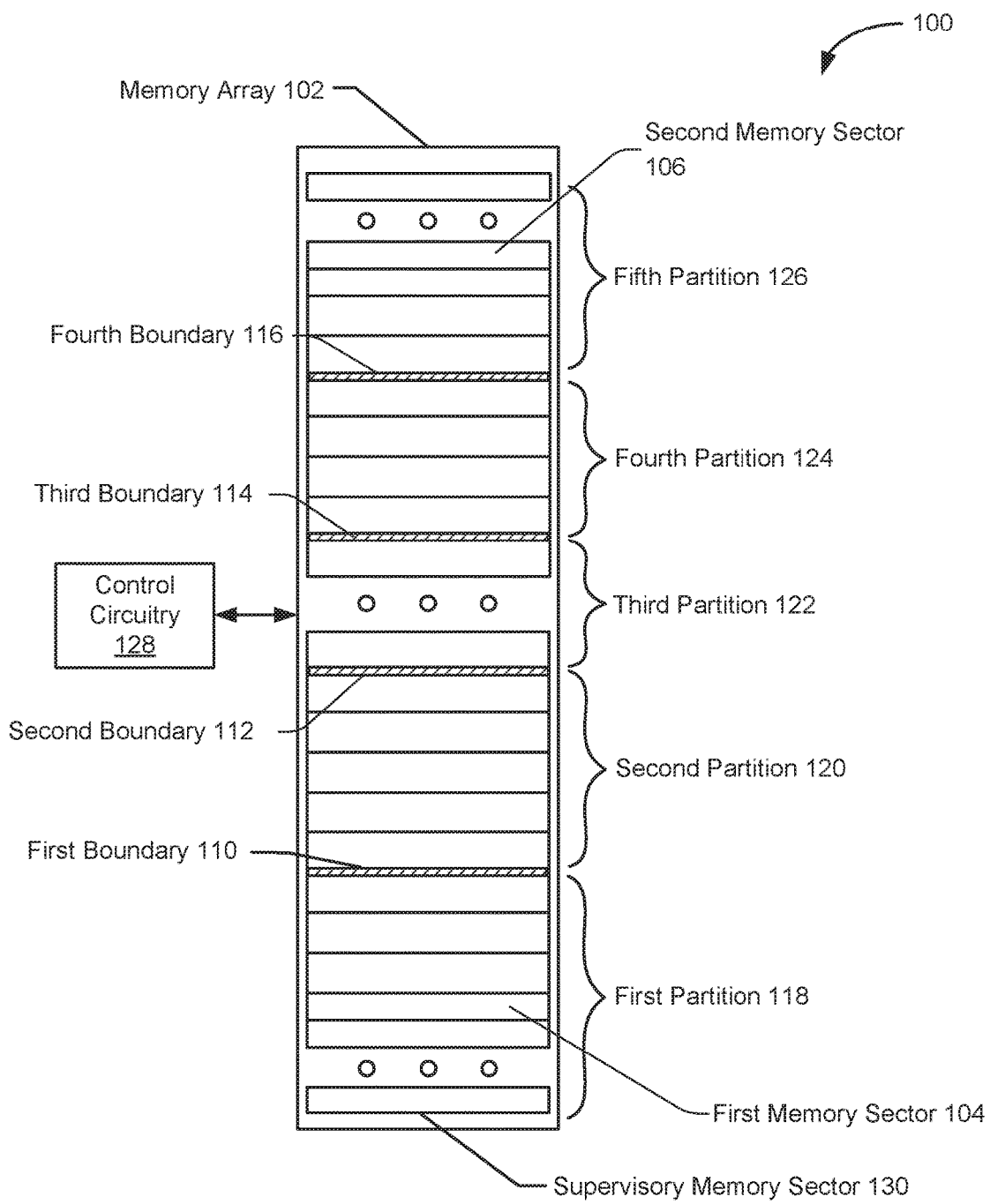
FIG. 1 illustrates an example of a configurable wear leveling memory device including sectors of more than one size, configured in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

In various embodiments, memory devices may be limited as to the number of program and erase (PE) cycles they may undergo because the memory cells degrade to a point they are unable to reliably retain data for a sufficient time period. As the number of PE cycles (also referred to herein as endurance) is increased, the length of time data is reliably retained (also referred to herein as retention) is reduced. In some embodiments, wear leveling techniques may be implemented to move frequently modified information to different areas of the memory array to limit the number of PE cycles implemented in any one area. Such wear leveling techniques may be used to reduce the effective PE cycles on the area of memory storing a logical block of information. However, when applied to an entire memory array, wear leveling also increases the effective PE cycles on areas of memory storing logical blocks of information which are modified less frequently, thereby reducing the retention period of the less frequently modified information. Moreover, such reduction in retention period due to movement of the data may occur without the knowledge of the user of the memory. The user may believe that low cycled areas of the memory array have longer retention periods, but wear leveling techniques may have actually reduced the retention period by moving information from low cycled physical sectors to higher cycled physical sectors. In various embodiments, a sector may be a unit of erase and/or program or overwrite. Accordingly, a size of a sector may be determined or defined by a size of a portion of memory included in an erase, program, or overwrite operation.

As will be discussed in greater detail below, wear leveling techniques may include various methods of mapping logical sectors to physical sectors and tracking the erase count of each physical sector so that when a PE cycle threshold value is reached for a physical sector, the data in the sector is moved to another physical sector with fewer erase cycles and the logical to physical map is updated. This makes the logical sector appears to support many more PE cycles than is possible for any one physical sector thus spreading the PE cycle wear of a logical sector across many physical sectors such that over time all physical sectors have a roughly equal number of PE cycles and wear.

Some wear leveling techniques remain limited because they do not provide any user control of which portions of the memory array are wear leveled to increase cycling capacity, and which portions of the memory array are not wear leveled to maintain longer data retention. For example, some memory devices with an internal wear leveling mechanism use most or all physical sectors in the device in the wear leveling operation. In such embodiments, a memory device is unable to control which logical sectors may be relocated into physical sectors that have received a higher number of PE cycles than the physical sector currently in use by a logical sector. This can cause a logical sector containing data that needs long retention time to be moved to a physical sector that has undergone a higher number of PE cycles and therefore reduced retention time, without the knowledge of the flash device user. Accordingly, areas of memory where high retention is desirable, such as rarely updated code, may be moved into highly PE cycled sectors by a wear leveling algorithm, thus reducing the retention time for that memory area without the user's knowledge.

Various embodiments are disclosed herein that are configured to provide memory devices that implement user configurable wear leveling. Accordingly, some areas of the memory array may undergo wear leveling for higher apparent endurance of some logical sectors, and other areas of the memory array do not undergo wear leveling to maintain retention. Such portions of the memory array that undergo wear leveling and that do not undergo wear leveling may be explicitly defined in a number of ways disclosed herein. In one example, address pointers may be used to define boundaries between partitions (address ranges) of the memory array and to indicate for each partition whether that partition is within a pool of sectors used in wear leveling or not within the wear leveling pool. Such explicit definition of logical address ranges gives the memory user control over which memory areas receive lower PE cycles and therefore have longer retention, and which areas are effectively able to have higher PE cycles than is possible for a single area of memory to support. Additional details of such configurable wear leveling are provided below.

FIG. 1 illustrates an example of a configurable wear leveling memory device including sectors of more than one size, configured in accordance with some embodiments. As will be discussed in greater detail below, a memory device, such as memory device 100, may be configured to enable a user to explicitly select some logical portions of memory for inclusion in a set or pool of physical memory portions used in wear leveling, and further enable a user to explicitly exclude other logical memory portions from use in such wear leveling. A contiguous group of logical portions is referred to as a partition, and each partition may be designated for use in wear leveling or excluded from wear leveling. Accordingly, various embodiments disclosed herein provide flexibility to a user to choose which logical portions may have low PE cycles and therefor longer data retention versus which logical portions may have high PE cycle endurance but shorter retention. As will be discussed in greater detail below, logical portions may describe logical sectors, and physical portions may describe physical sectors. However, in various embodiments, such portions might not be aligned with sectors, and a portion might not directly correspond with a sector in memory space.

In various embodiments, memory device 100 may be a storage device that includes several non-volatile memory elements in a memory array, such as memory array 102. Accordingly, memory array 102 may include numerous columns and rows of memory elements that may be grouped or divided into sectors. In various embodiments, such sectors may be a group of data units, such as words, that may be erased as a unit. In various embodiments, the sectors shown in FIG. 1 are logical sectors that may be mapped to physical sectors. In some embodiments, logical sectors may be sectors of data that are referenced by a memory array address that is independent of the physical location of the data within the memory array. Accordingly, a host system may view a logical sector as residing at particular address (e.g. starting at address zero of the memory array). In this example, the data may actually be located in a different part of the memory array address space, at a different physical address. In various embodiments, memory device 100 maintains a mapping table from the logical address of the data to corresponding actual physical locations. In this way, memory device 100 may include various physical memory sectors that may be mapped to logical memory sectors. In various embodiments, memory array 102 may include memory sectors of varying sizes. For example, memory array 102 may include supervisory memory sector 130 which may have a first size, such as 4 kilobytes (KB), and may further include first memory sector 104 which may be a large memory sector and have a second size, such as 256 KB. In some embodiments, memory array 102 may also include second memory sector 106, which may be a last memory sector in memory array 102, and may have a first size of 4 KB as well.

Furthermore, the sectors may be grouped into partitions. Accordingly, memory array 102 may include various memory partitions that are contiguous group of logical sectors which may be defined by boundaries. For example, memory array 102 may include first boundary 110, second boundary 112, third boundary 114, and fourth boundary 116 which may define first partition 118, second partition 120, third partition 122, fourth partition 124, and fifth partition 126. As will be discussed in greater detail below, such boundaries may be configurable based on wear leveling parameters which may be user specified. Accordingly, a user may specify and designate sizes and boundaries associated with partitions. Moreover, the wear leveling parameters may also indicate whether or not a particular partition is to be included in physical sectors used in wear leveling. As will be discussed in greater detail below, the sizes of partitions may be flexible or configurable based on user input.

As previously discussed, wear leveling may be a sector erase management technique used to improve the logical sector endurance in memory devices, such as memory device 100. Wear leveling spreads the PE cycles applied to one logical sector, across multiple physical sectors which are in a set or pool of physical sectors in the memory device. The pool of physical sectors is available for the relocation of logical sector data. For example, when implementing wear leveling, logical sectors may be mapped to physical sectors, and an erase count of each physical sector may be tracked so that when a PE cycle threshold value is reached or exceeded for a particular physical sector, the data in the physical sector is moved to another physical sector with fewer erase cycles, and the logical to physical map is updated. Such tracking of PE cycles of physical sectors, and movement of logical sectors across physical sectors makes the logical sector appear to support many more PE cycles than is possible for any one physical sector. Accordingly, the PE cycle wear of a logical sector is spread across many physical sectors such that over time all physical sectors have roughly equal number of PE cycle wear.

In a specific example, various sectors may utilize a form of wear leveling that places one smaller logical sector in a larger physical sector in which sub-sections of the physical sector may be erased individually. As the portion of the physical sector used by the smaller logical sector receives a certain number of erase cycles, the logical sector data is moved to the next sub-section of the larger physical sector. All sub-sections not currently in use by the smaller logical sector are kept erased to minimize column leakage. This movement of the logical sector through the physical sector spreads the PE cycle wear across the entire larger physical sector. In various embodiments, the smaller logical sector data remains within the same larger physical sector.

Accordingly, wear leveling is based on a mapping of logical sectors to physical sectors. During the lifetime of a memory device, such as memory device 100, this mapping is changed as logical sector content is moved from high PE cycle physical sectors to lower PE cycle physical sectors. This provides a more uniform distribution of PE cycles over all physical sectors. The logical to physical mapping information is stored in a dedicated memory array which is updated when logical sector data is moved from one physical sector to another. Sector data movement may occur when a program and/or an erase command is given by the host system or a component, such as a processor.

As will be discussed in greater detail below, control circuitry, such as control circuitry 128 and a dedicated storage location or register, such as supervisory memory sector 130, may be utilized to configure the mapping of logical sectors to physical sectors that undergo wear leveling. As disclosed herein, control circuitry may also be referred to herein as wear leveling control circuitry. More specifically, wear leveling parameters may be received and used to explicitly identify which logical sectors should be mapped to physical sectors included in a wear leveling pool and do undergo wear leveling. The wear leveling parameters may also be used to explicitly identify which logical sectors should be mapped to physical sectors which are not included in the wear leveling pool and do not undergo wear leveling. As discussed above, a memory device, such as memory device 100, may include various memory sectors that are included in a wear leveling pool and undergo wear leveling, and may further include memory sectors that are not included in a wear leveling pool and do not undergo wear leveling. In this way, wear leveling parameters may be configured to identify which partitions and corresponding logical memory sectors should be included in a pool of physical sectors undergoing wear leveling, and which partitions and corresponding logical memory sectors should be excluded.

More specifically, supervisory memory sector 130 may be configured to store one or more data values that identify a mapping that identifies logical memory sectors, further identifies partitions that such memory sectors are included in, and further identifies a wear leveling setting associated with such a partition. An example of a representation of such a mapping is shown below in Table 1:

TABLE 1

| Sectors | Partitions | Wear Leveling Setting (0 = excluded, 1 = included) |
|---|---|---|
| Sector 1 | First | 0 |
| Sector 2 | Partition | |
| Sector 3 | Second | 1 |
| Sector 4 | Partition | |
| Sector 5 | Third | 1 |
| Sector 6 | Partition | |
| Sector 7 | Fourth | 0 |
| Sector 8 | Partition | |

Accordingly, as shown in Table 1, a mapping may identify logical address sectors as well as their associated partitions. Moreover, the mapping may further identify a wear leveling setting for each partition. As discussed above, such a wear leveling setting or characteristic may be user specified and determined based on a received user input. In this way, a user may explicitly assign logical memory sectors and partitions to be included or excluded from a wear leveling pool of physical memory sectors. Furthermore, if a partition, such as fifth partition 126, is not identified in the mapping, it may be assigned a default value, such as "1" indicating it should be included. Similarly, such a default value may be "0".

Various embodiments are contemplated and disclosed herein regarding the assigning of logical memory sectors to wear leveling pools. For example, while explicit partition labeling was previously described, other suitable techniques may be implemented as well. For example, a storage location, such as supervisory memory sector 130, may store several pre-defined partition maps, and a configuration parameter or value may be used to select a map that is used. In some embodiments, such pre-defined maps may be generated based on different views of the address space of memory array 102. For example, the pre-defined maps may include a first map that excludes the lowest ⅛th addresses of the memory address space from wear leveling. The pre-defined maps may further include a second map that excludes the lowest ¼ of the address space from wear leveling. The pre-defined maps may also include a third map that excludes the lower ½ of the address space from wear leveling. In this example, a user may provide an input that includes the configuration parameter and selects a particular pre-defined map to apply. Examples of such pre-defined partition maps are illustrated in Tables 2, 3, and 4 below:

TABLE 2

| Sectors | Partitions | Wear Leveling Setting (0 = excluded, 1 = included) |
|---|---|---|
| Sector 0 | Partition 0 | 0 |
| Sector 1 | Partition 1 | 1 |
| Sector 2 | | |
| Sector 3 | | |
| Sector 4 | | |
| Sector 5 | | |
| Sector 6 | | |
| Sector 7 | | |

As shown in Table 2, the lower ⅛th of the address space is excluded from wear leveling.

TABLE 3

| Sectors | Partitions | Wear Leveling Setting (0 = excluded, 1 = included) |
|---|---|---|
| Sector 0 | Partition 0 | 0 |
| Sector 1 | | |
| Sector 2 | Partition 1 | 1 |
| Sector 3 | | |
| Sector 4 | | |
| Sector 5 | | |
| Sector 6 | | |
| Sector 7 | | |

As shown in Table 3, the lower ¼th of the address space is excluded from wear leveling.

TABLE 4

| Sectors | Partitions | Wear Leveling Setting (0 = excluded, 1 = included) |
|---|---|---|
| Sector 0 | Partition 0 | 0 |
| Sector 1 | | |
| Sector 2 | | |
| Sector 3 | | |
| Sector 4 | Partition 1 | 1 |
| Sector 5 | | |
| Sector 6 | | |
| Sector 7 | | |

As shown in Table 4, the lower ½ of the address space is excluded from wear leveling. While the above examples illustrate some embodiments, various other embodiments are contemplated and disclosed herein. For example, if more memory sectors are implemented and available, memory space allocation may be implemented at granularities of 1/16 or 1/32 of memory space. Furthermore, memory portions may be assigned from either side of memory, such as from an address of "0" or from the end or top of memory. Accordingly the above examples are not intended to limit the scope of the embodiments disclosed herein.

Furthermore, the assigning of logical memory sectors to wear leveling pools may be implemented by utilizing address pointers to define address ranges for partitions to be included or excluded from wear leveling. For example, address pointer pairs may identify beginning and ending points of address ranges that define partitions, and further identify a wear leveling setting associated with such partitions. As illustrated below in Table 5, a first address pointer pair including a first and second address pointer may identify a beginning and ending point of partition 0, and further identify a wear leveling setting indicating that partition 0 should be excluded from the wear leveling pool. Moreover, a second address pointer pair including a third and fourth address pointer may identify a beginning and ending point of partition 1, and further identify a wear leveling setting indicating that partition 1 should be included in the wear leveling pool. Furthermore a third address pointer pair including a fifth and sixth address pointer may identify a beginning and ending point of partition 2, and further identify a wear leveling setting indicating that partition 2 should be excluded from the wear leveling pool. In some embodiments, address pointer pairs may only be provided for partitions included in the wear leveling pool, and other partitions may be set to a default value of "0" and excluded from the wear leveling pool. In various embodiments, the opposite may be true, and address pointer pairs may only be provided for partitions excluded from the wear leveling pool.

TABLE 5

| Sectors | Partitions | Address Range Pointers |
|---|---|---|
| Sector 0 | Partition 0 | Start 0 |
| Sector 1 | included | End 0 |
| Sector 2 | Partition 1 | Start 1 |
| Sector 3 | included | |
| Sector 4 | | |
| Sector 5 | | End 1 |
| Sector 6 | Partition 2 | Start 0 |
| Sector 7 | excluded | End 0 |

Moreover, the assigning of logical memory sectors to wear leveling pools may be implemented by utilizing a single address pointer per partition. In some embodiments, partitions may be defined relative to a reference address or other pointers. For example, a first partition (Partition 0) may be defined by an address range identified by a first pointer (Pointer A) to a base address, which may be a starting address of the memory. A second partition (Partition 1) may be defined by an address range identified by a second pointer (Pointer B) to the first pointer (Pointer A), or more specifically, to an increment of the first pointer (Pointer A+1). Moreover, a third partition (Partition 2) may be defined by an address range identified by another reference address, such as the end of the address space of the memory array, to the second pointer (Pointer B), or more specifically, to an increment of the first pointer (Pointer B+1). As shown in Table 6 below, the mapping may also store wear leveling settings for the defined partitions, and a toggle or flag bit for validity of the address pointers.

TABLE 6

| Sectors | Partitions | Address range pointers | Address pointer valid (0 = invalid, 1 = valid) | Wear Leveling Setting (0 = excluded, 1 = included) |
|---|---|---|---|---|
| Sector 0 | Partition 0 | | | |
| Sector 1 | | | | |
| Sector 2 | Partition 1 | Pointer A + 1 | 1 | 1 |
| Sector 3 | | | | |
| Sector 4 | | | | |
| Sector 5 | | | | |
| Sector 6 | Partition 2 | Pointer B + 1 | 1 | 0 |
| Sector 7 | | | | |

While the above description has described inclusion in and exclusion from wear leveling, as will be discussed in greater detail below, various amounts of wear leveling applied to sectors may also be specified. For example, the wear leveling parameters may include wear leveling characteristics or settings that specify or identify an amount of wear leveling to be applied to each logical sector and each partition associated with such logical sectors. Thus, in addition to an amount of wear leveling characterizing inclusion in wear leveling, the amount may also characterize a quantity or degree of wear leveling. For example, the wear leveling characteristics may include a first wear leveling setting indicating a first limit of wear leveling that should be applied to a first partition, a second wear leveling setting indicating a second limit of wear leveling that should be applied to a second partition, a third wear leveling setting indicating a third limit of wear leveling should be applied to a third partition, and a fourth wear leveling setting indicating no wear leveling should be applied to a fourth partition.

In various embodiments, the wear leveling characteristics may be determined based on one or more additional types of information or parameter included in the wear leveling parameters. For example, the wear leveling parameters may specify a number of PE cycles associated with memory sectors. In various embodiments, such a number may be user specified, and may characterize an expected number of PE cycles. In some embodiments, a component, such as control circuitry 128, may be configured to identify an amount of wear leveling applied to the memory sectors based on the specified number of PE cycles. For example, if the number is above a threshold value of PE cycles, a memory sector may be included in a wear leveling pool. Moreover, if the number is below a threshold value of PE cycles, a memory sector may be excluded from a wear leveling pool.

As discussed above, the wear leveling parameters may specify logical sizes of partitions. In some embodiments, a component, such as control circuitry 128, may be configured to identify an amount of wear leveling applied to the memory sectors based on the size of the partition. For example, if the identified size is larger than a designated size, a memory sector may be included in a wear leveling pool. Moreover, if the number is smaller than a designated size, a memory sector may be excluded from a wear leveling pool. In this example, the designated size may be a default value or may be user specified. Additional details of such configuration of wear leveling is discussed in greater detail below with reference FIG. 3, FIG. 4, FIG. 5, and FIG. 6.

Figure 2:
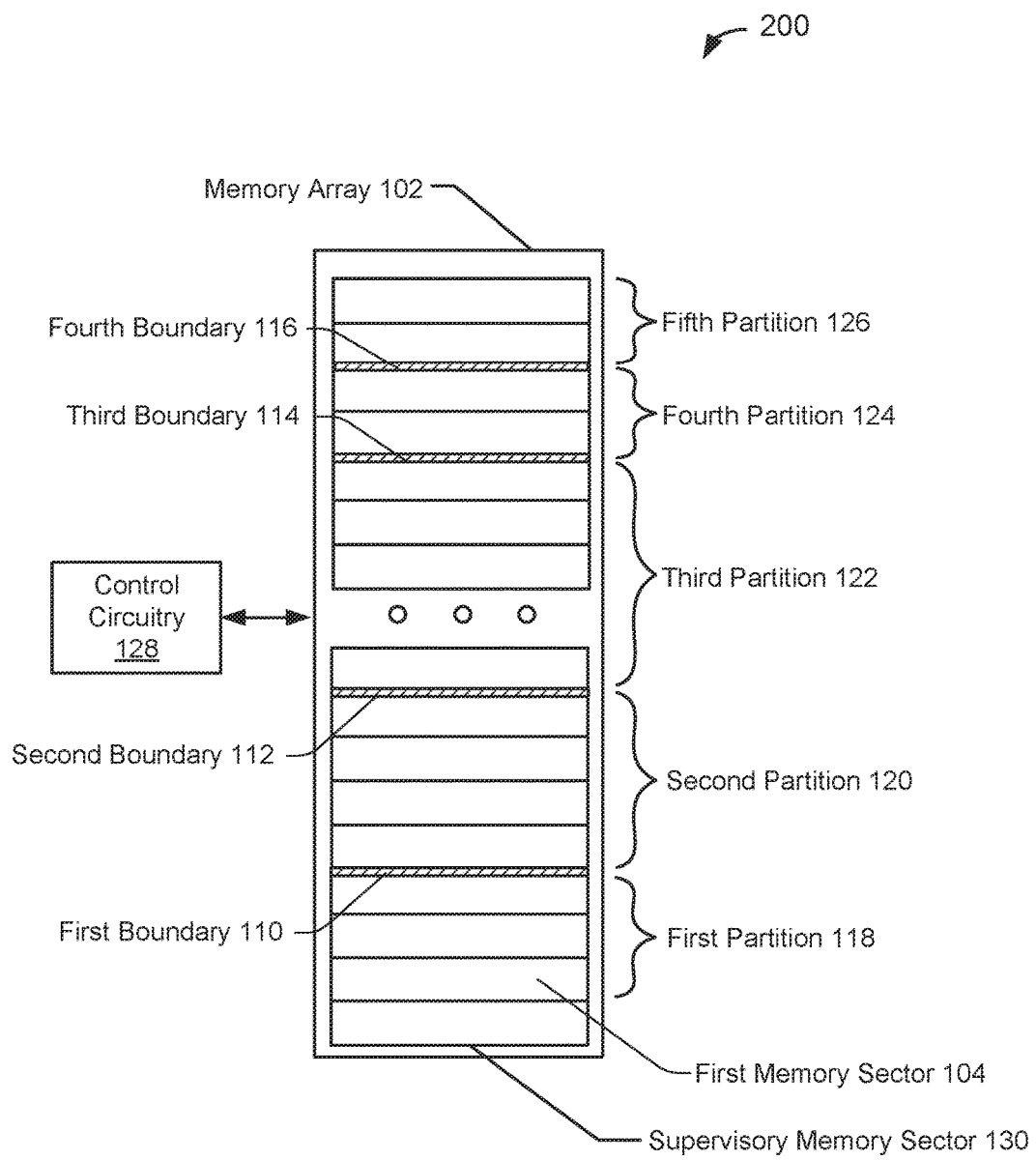
FIG. 2 illustrates an example of a configurable wear leveling memory device including uniform sector sizes, configured in accordance with some embodiments.

FIG. 2 illustrates an example of a configurable wear leveling memory device including uniform sector sizes, configured in accordance with some embodiments. As discussed above, a memory device, such as memory device 200, may be configured to enable a user to explicitly select some logical sectors of memory for inclusion in a set or pool of physical memory sectors used in wear leveling, and is further configured to enable a user to explicitly exclude other logical memory sectors from use in such wear leveling. As also discussed above, a memory array, such as memory array 102 may include various partitions defined by various boundaries and may be communicatively coupled with control circuitry 128. For example, memory array 102 may include first boundary 110, second boundary 112, third boundary 114, and fourth boundary 116 which may define first partition 118, second partition 120, third partition 122, fourth partition 124, and fifth partition 126. As discussed above, such boundaries may be configurable based on wear leveling parameters which may be user specified. Accordingly, a user may specify and designate sizes and boundaries associated with partitions. Moreover, the wear leveling parameters may also indicate inclusion or exclusion of partitions from sets or pools of physical sectors that undergo wear leveling, as may be managed by control circuitry 128 and supervisory memory sector 130.

As shown in FIG. 2, memory array 102 may include uniformly sized memory sectors. For example, all logical memory sectors included in memory array 102 may be of the same size and may be included in fixed size partitions. In this example, first memory sector 104, which may be a first memory sector in memory array 102, may be the same size as another memory sector, such as a last memory sector in memory array 102. More specifically, such memory sectors may have a size of 256 KB. In this way, embodiments disclosed herein may be implemented utilizing memory devices that have uniform sector sizes.

Figure 3:
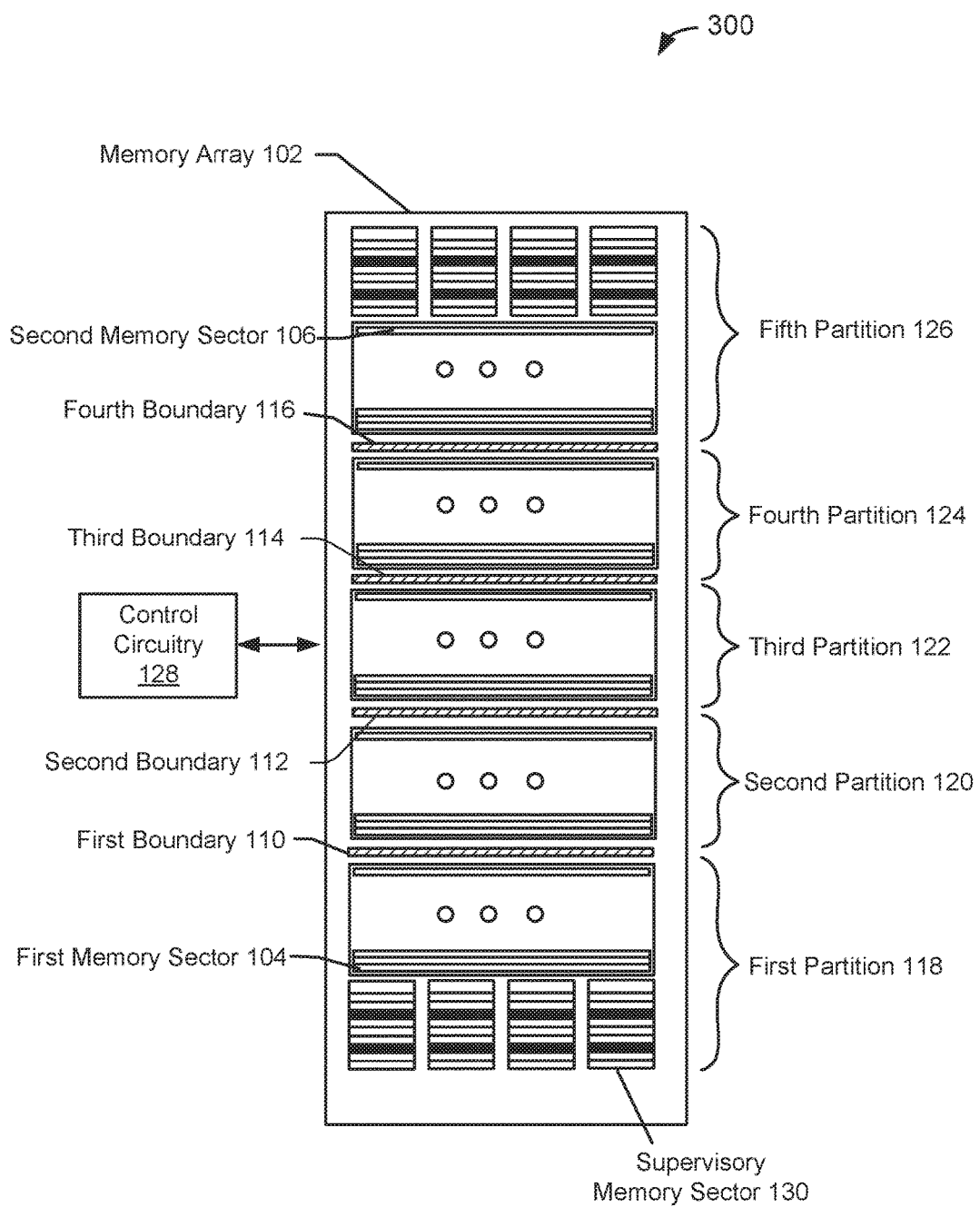
FIG. 3 illustrates an example of a configurable wear leveling memory device where the parameter sectors are excluded from wear leveling, and other sectors are grouped in fixed partition sizes, configured in accordance with some embodiments.

FIG. 3 illustrates an example of a configurable wear leveling memory device where the parameter sectors are excluded from wear leveling, and other sectors are grouped in fixed partition sizes, configured in accordance with some embodiments. FIG. 3 also illustrates an example of a configuration of memory array 102 in which there are small memory sectors at the top and bottom of memory array 102, with large memory sectors in the middle of memory array 102. As discussed above, a memory device, such as memory device 300, may include a memory array, such as memory array 102 may include various partitions defined by various boundaries and may be communicatively coupled with control circuitry 128. For example, memory array 102 may include first boundary 110, second boundary 112, third boundary 114, and fourth boundary 116, which may define first partition 118, second partition 120, third partition 122, fourth partition 124, and fifth partition 126. In various embodiments, the end of fifth partition 126 may be defined by the end of memory array 102 which may provide a fifth boundary. As discussed above, such partitions may include memory sectors such as first memory sector 104, which may be a first memory sector 104 in memory array 102, and second memory sector 106, which may be a last memory sector in memory array 102. Moreover, memory array 102 may also include supervisory memory sector 130.

In various embodiments, memory array 102 may be configured to have partitions that have fixed size. Accordingly, sizes of the partitions may be specified by a hardware manufacturer, or may be determined based on hardware properties of memory device 100, such as a size of memory array 102. Moreover, in some embodiments, such partitions may be uniformly sized. As discussed above, the inclusion and exclusion of logical memory sectors included in partitions may be determined based on wear leveling parameters stored in supervisory memory sector 130. As will be discussed in greater detail below with reference to FIG. 4 and FIG. 5, such wear leveling parameters may be user specified, and may be received from a user via a communications interface.

Figure 4:
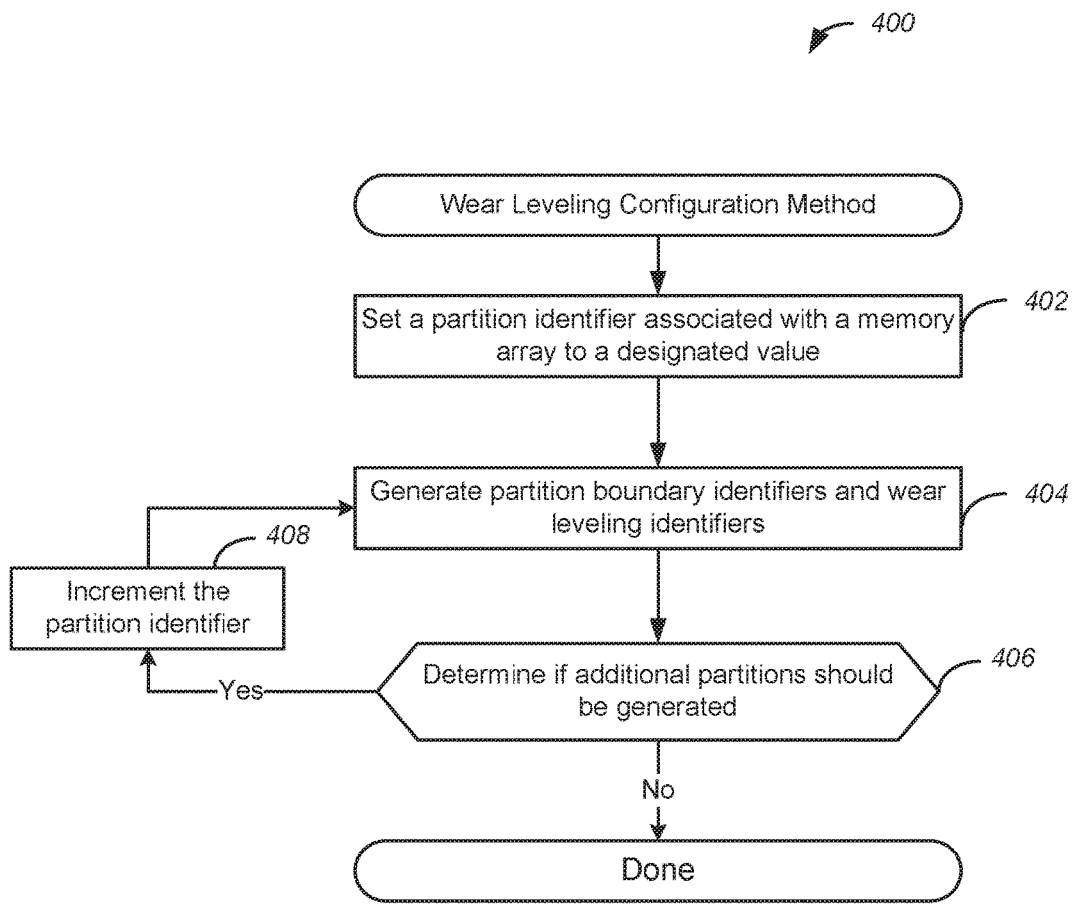
FIG. 4 illustrates a flow chart of an example of a method for configuring wear leveling of a memory device, implemented in accordance with some embodiments.

FIG. 4 illustrates a flow chart of an example of a method for configuring wear leveling of a memory device, implemented in accordance with some embodiments. As similarly discussed above, a memory device may be utilized to enable a user to explicitly select some logical sectors of memory for inclusion in a set or pool of physical memory sectors used in wear leveling, and further enable a user to explicitly exclude other logical memory sectors from use in such wear leveling. As will be discussed in greater detail below, such configurability may provide increased flexibility to a user when implementing wear leveling.

Method 400 may commence with operation 402 during which a partition identifier associated with a memory array may be set to a designated value. As discussed above with reference to FIG. 1, FIG. 2, and FIG. 3, logical sectors of a memory array may be represented as partitions. Accordingly, during method 400, such partitions may be configured and defined. In various embodiments, method 400 may commence with configuring an initial partition, and may start by setting the designated value identifying a partition to a default value that may be a partition number, such as 0.

Method 400 may proceed to operation 404 during which partition boundary identifiers and wear leveling identifiers may be generated. In various embodiments, the partition boundary identifiers may be one or more data values that identify the boundaries of the partition that is being configured and defined. Accordingly, the partition boundary identifiers may include data values characterizing address pointers, or any other suitable identifier discussed above with reference to FIG. 1. In this way, during operation 404, boundaries may be defined for a particular partition within a logical memory space of a memory array. As discussed above, such boundary identifiers may be user specified, and based on a received user input. More specifically, partition boundary identifiers and wear leveling identifiers may be generated based on the received wear leveling parameters.

Accordingly, a component, such as control circuitry, may generate the boundary identifiers based on the received input that includes the wear leveling parameters. Furthermore, wear leveling identifiers may also be generated based on a received input. Such wear leveling identifiers may also be referred to herein as wear leveling characteristics or settings. Accordingly, during operation 404, wear leveling identifiers may be generated that identify whether or not the partition should be included in a wear leveling pool. In some embodiments, the wear leveling identifiers may further identify an amount or limit of wear leveling applied to the partition if the partition is included in the wear leveling pool.

Method 400 may proceed to operation 406 during which it may be determined if additional partitions should be generated. As discussed above, the memory space of a memory array may be divided into numerous partitions, and various iterations of operation 404 may be implemented to generate partition boundary identifiers and wear leveling identifiers for each partition. If it is determined that no additional partitions should be generated, method 400 may terminate. However, if it is determined that additional partitions should be generated, method 400 may proceed to operation 408. In various embodiments, such a determination may be made based on a user input. For example, a user may specify that additional partitions should be generated, and method 400 may proceed to operation 408. In some embodiments, such a determination may also be made based on a comparison of the partition boundary defined during operation 404 and a particular address in the memory space of the memory array. For example, if the defined boundary, which may be an address pointer, of the partition defined during operation 404 is not the last address in the memory array, and some memory space remains undefined, method 400 may proceed to operation 408.

Accordingly, during operation 408 a partition identifier may be incremented. In this way, the partition identifier may be modified or adjusted to identify a new and different partition, and method 400 may return to operation 404 during which partition boundary identifiers and wear leveling identifiers may be generated for the new partition. For example, if the previously defined partition identifier was "0", the partition identifier may be incremented to "1", and partition boundary identifiers and wear leveling identifiers may be generated for partition 1 during another iteration of operation 404. In this way, numerous partitions may be defined, and wear leveling identifiers associated with those partitions may also be defined such that an amount or limit of wear leveling, or no wear leveling at all, is specified for each defined partition.

Figure 5:
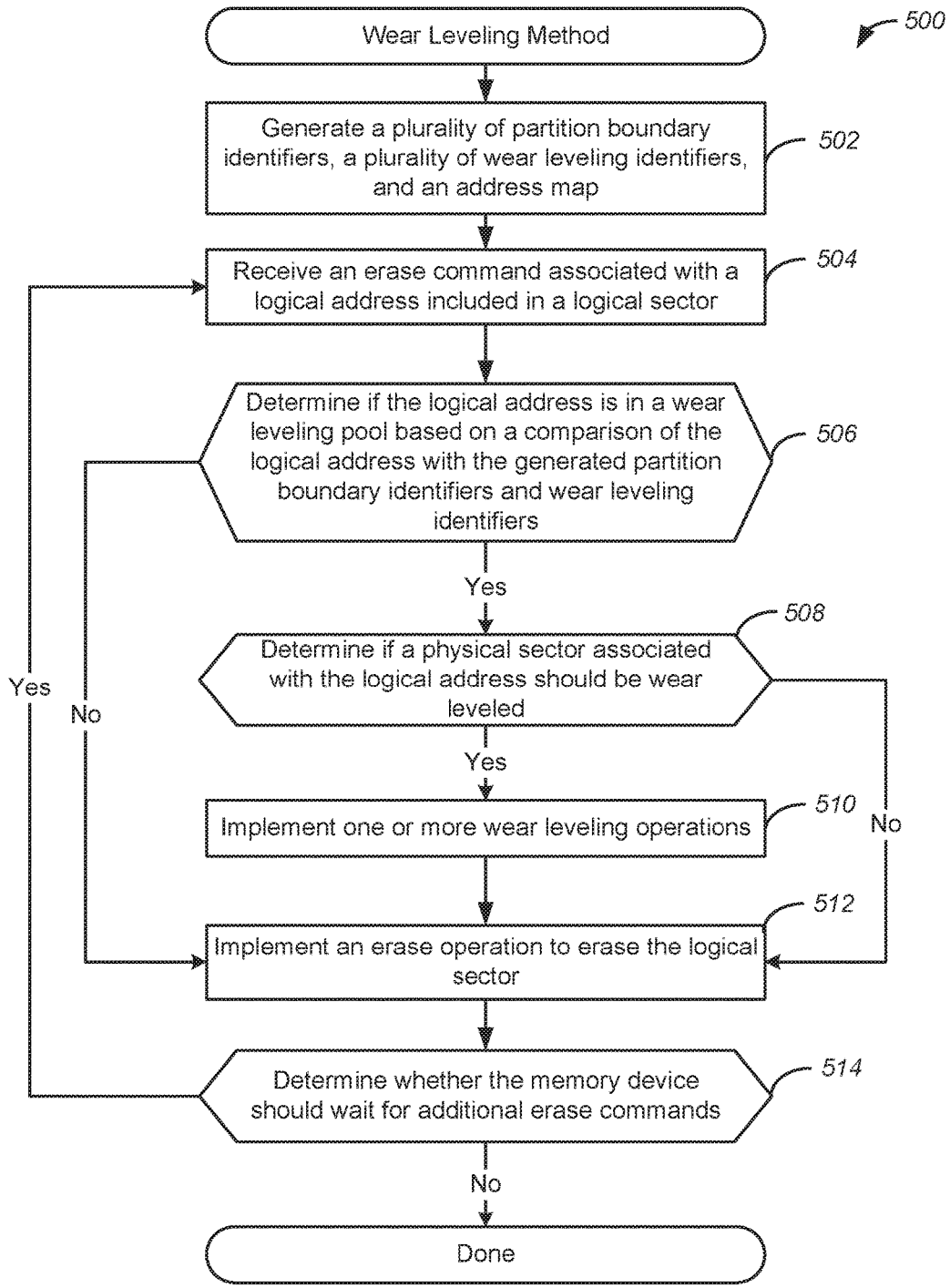
FIG. 5 illustrates a flow chart of another example of a method for configuring wear leveling of a memory device, implemented in accordance with some embodiments.

FIG. 5 illustrates a flow chart of another example of a method for configuring wear leveling of a memory device, implemented in accordance with some embodiments. As similarly discussed above, a memory device may be utilized to enable a user to explicitly select some logical sectors of memory for inclusion in a set or pool of physical memory sectors used in wear leveling, and further enable a user to explicitly exclude other logical memory sectors from use in such wear leveling. Moreover, such selections may form the basis of logical sector/physical sector mappings that underlie subsequent wear leveling operations. In this way, a user may be provided with the ability to configure which logical sectors undergo how much wear leveling.

Method 500 may commence with operation 502 during which a plurality of partition boundary identifiers and a plurality of wear leveling identifiers may be generated. As discussed above with reference to FIG. 4, partition boundary identifiers and wear leveling identifiers may be generated for various different partitions of a logical memory space of a memory array. As also stated above, such identifiers may be generated iteratively as several partitions are defined by partition boundary identifiers, which may be address pointers, and wear leveling characteristics are defined for each partition based on the designation of wear leveling identifiers. Moreover, such partition boundary identifiers and wear leveling identifiers may be generated based on user inputs received as wear leveling parameters. Accordingly, the identifiers may be user configurable, thus enabling user configuration of the sizes and number of partitions, as well as the amount of wear leveling allowed for each partition.

In some embodiments, a component, such as control circuitry, may generate, store, and maintain the partition boundary identifiers and wear leveling identifiers in one or more data structures. For example, the control circuitry may generate a first data structure that identifies the mapping of logical sector addresses to partitions and their associated partition identifiers. Moreover, the control circuitry may generate and store a second data structure that identifies logical sectors and partitions, and maps them to the wear leveling pool, as may be indicated by a flag or bit, as well as their associated wear leveling characteristics or settings. Furthermore, as will be discussed in greater detail below, the control circuitry may also generate a third data structure that stores an address mapping of logical to physical addresses, and such an address mapping may be generated based, at least in part, on the plurality of partition boundary identifiers and the plurality of wear leveling identifiers.

Method 500 may proceed to operation 504 during which an erase command may be received. In various embodiments, the erase command may be associated with a logical address included in a logical sector. Accordingly, such an erase command may be received from a component, such as a processor of the memory, and may be received during operation of the memory device. Thus, operation 502 may be implemented during a configuration phase of the memory device, and operation 504 may occur subsequently and during operation of the memory device itself.

Method 500 may proceed to operation 506 during which it may be determine if the logical address associated with the erase command is included in a wear leveling pool. If it is determined that the logical address associated with the erase command is not included in a wear leveling pool, method 500 may proceed to operation 512. However, if it is determined the logical address associated with the erase command is included in a wear leveling pool, method 500 may proceed to operation 508. In various embodiments, such a determination may be made based on a comparison of the logical address with the generated partition boundary identifiers and wear leveling identifiers discussed above with reference to operation 502. Accordingly, the logical address associated with the erase command may be compared with the address ranges specified by the partition boundary identifiers, and a partition that includes the logical address may be identified. Furthermore, wear leveling identifiers may be looked up based on the identified partition, and wear leveling characteristics or settings may be identified. For example, the wear leveling identifiers may indicate that the identified partition that includes the logical address associated with the erase command is included in the wear leveling pool and should potentially be wear leveled.

If it is determined that the logical address is included in a wear leveling pool, method 500 may proceed to operation 508 during which it may be determined if a physical sector associated with the logical address should be wear leveled. If it is determined that the physical sector associated with the logical address should not be wear leveled, method 500 may proceed to operation 512. However, if it is determined that the physical sector associated with the logical address should be wear leveled, method 500 may proceed to operation 510.

In various embodiments, such a determination may be made based on a comparison of a number of PE cycles associated with the physical sector and a designated threshold value. In various embodiments, a component, such as a processor or control circuitry, may keep track of and count a number of PE cycles applied to each physical sector during operation of the memory device. In some embodiments, the PE cycle count associated with the physical sector identified during operations 504 and 506 may be looked up, and the PE cycle count may be compared with a threshold value. In various embodiments, the threshold value may be a designated value that has been specified by a user. As previously discussed, a user may specify a threshold value for a partition to identify when wear leveling is applied to sectors included in that partition. Moreover, as also discussed above, different threshold values may be utilized to enable different amounts of wear leveling being applied to different partitions. In some embodiments, the threshold value may be a default value set by a manufacturer. Thus, if it is determined that the PE cycle count does not exceed the threshold value, it may be determined that wear leveling should not be applied, and method 500 may proceed to operation 512. Moreover, if it is determined that the PE cycle count does exceed the threshold value, it may be determined that wear leveling should be applied, and method 500 may proceed to operation 510.

Accordingly, if it is determined that the logical address is included in a wear leveling pool and that wear leveling should be applied, method 500 may proceed to operation 510 during which one or more wear leveling operations may be implemented. In various embodiments, such wear leveling operations may include swapping the physical sector with another physical sector in the wear leveling pool that currently has the lowest number of PE cycles. Such swapping may include swapping of data between physical sectors, and also updating of their associated logical address mapping, as discussed in greater detail below. In this way, during operation of the memory device, PE cycles may be tracked for the physical sectors included in the memory device, including all those undergoing wear leveling, and data may be moved when PE cycle thresholds are met. As previously discussed, during such a wear leveling operation, the physical address of data is changed, typically to a location that has undergone fewer PE cycles, and the logical address remains the same.

Accordingly, during operation 510, an address mapping of logical addresses to physical addresses may be updated. In various embodiments, the control circuitry may have previously generated a third data structure that includes a mapping of the logical sectors and/or partitions to physical sectors. Such a mapping may have been generated during operation 502, and may have also been generated based on the identified wear leveling characteristics specifying whether or not a logical sector is included in a wear leveling pool. For example, if a logical address and associated partition have a wear leveling identifier or characteristic that indicates it should undergo wear leveling, that partition, as well as the logical sectors included in the partition, are mapped to physical sectors identified as being included in the wear leveling pool. Such mapping may randomly assign the logical sectors to physical sectors, or such assignment may occur sequentially. Similar mapping may also be implemented for partitions and logical sectors not undergoing wear leveling. In this way, a component, such as the control circuitry, may store and maintain a mapping of logical addresses to physical addresses, and such a mapping complies with the wear leveling characteristics initially specified by the user.

Accordingly, as stated above, this mapping may be updated based on the one or more wear leveling operations. More specifically, the mapping of logical sectors to physical sectors that was generated during operation 502 may be updated every time data is moved as part of the wear leveling process when the memory device is in use. In this way the memory device may accurately track the physical storage location of data that is associated with a particular logical address.

Method 500 may proceed to operation 512 during which an erase operation may be implemented. Accordingly, a component, such as a processor, may implement an erase operation on the logical sector identified during operation 504 as well as its associated physical sector. In an example in which operation 512 is being implemented after wear leveling, the corresponding physical sector may be the new physical sector selected during wear leveling. Furthermore, a counter associated with the physical sector may be updated to accurately identify a number of PE cycles that have been applied to that physical sector.

Method 500 may proceed to operation 514 during which it may be determined whether or not the memory device should wait for additional erase commands. In some embodiments, such additional erase commands may occur during operation of the memory device. Accordingly, if it is determined that the memory device should wait for additional erase commands, as may be the case if use of the memory device continues, method 500 may return to operation 504. If it is determined that the memory device should not wait for additional erase commands, as may be the case if use of the memory device has ceased, method 500 may terminate.

Figure 6:
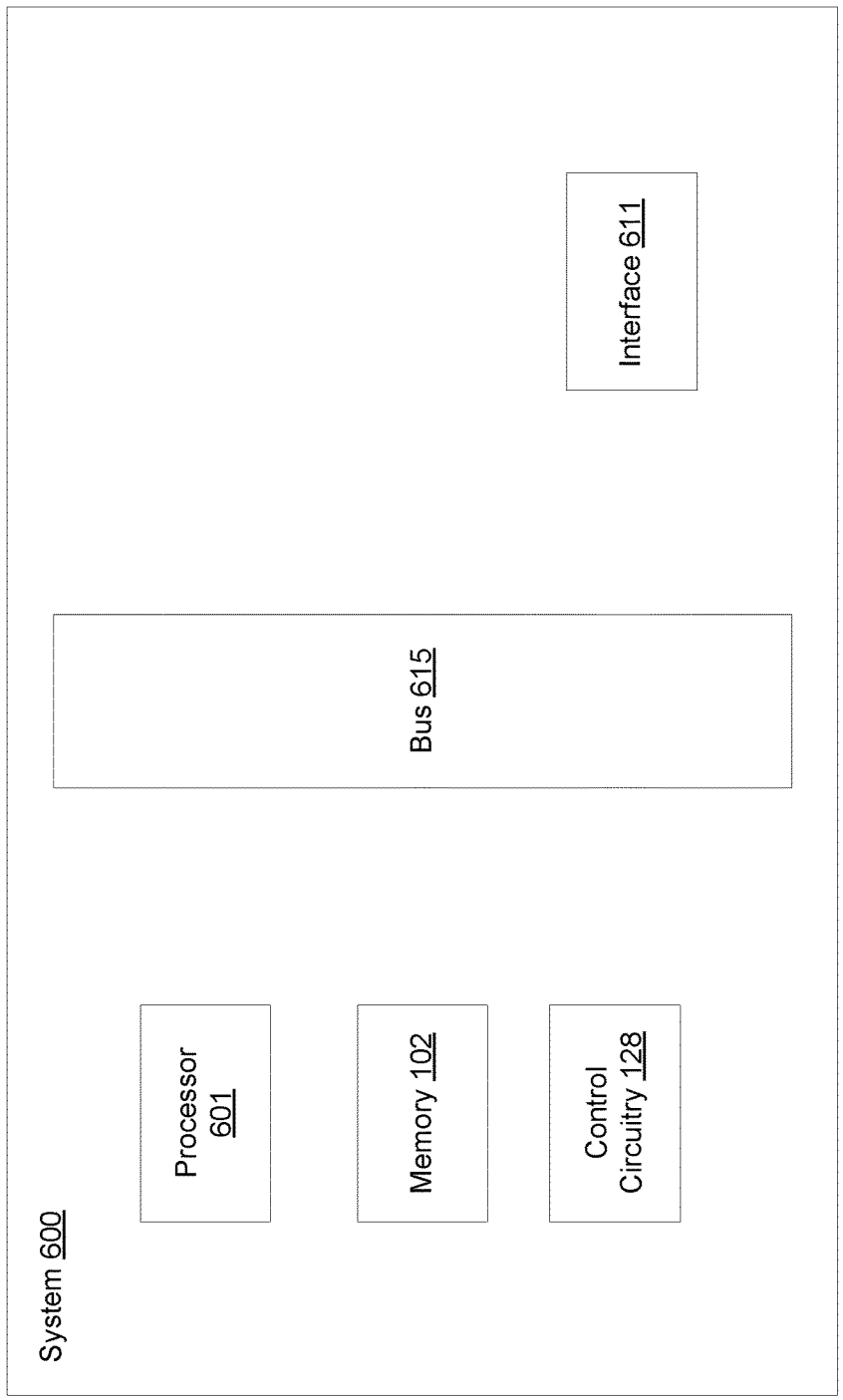
FIG. 6 illustrates an example of a configurable wear leveling memory system, configured in accordance with some embodiments.

FIG. 6 illustrates an example of a configurable wear leveling memory system, configured in accordance with some embodiments. According to particular example embodiments, system 600 may be suitable for implementing various components described above, such as memory device 100. In various embodiments, system 600 may include processor 601 which may be configured to implement one or more processing operations. For example, processor 601 may be configured to implement wear leveling operations associated with memory array 102, and may be further configured to implement read and write operations associated with memory array 102. System 600 may also include bus 615 which may be configured to enable communication between various components of system 600.

In various embodiments, system 600 may further include memory array 102 and control circuitry 128 which may be configured to implement the configurable wear leveling discussed above. In various embodiments, control circuitry 128 may include one or more processors and dedicated memory that may be configured to implement the previously described generations of data structures and mappings. In this way, system 600 may have a dedicated processing unit, such as control circuitry 128, which may be configured to implement the previously described configurable wear leveling. Moreover, in some embodiments, control circuitry 128 may be implemented in an application specific integrated circuit (ASIC), or may be implemented in reprogrammable logic of a field programmable gate array. In some embodiments, control circuitry 128 may be implemented in a programmable system or controller that further includes a non-volatile memory, such as a Programmable System On a Chip or PSoC™ controller, commercially available from Cypress Semiconductor of San Jose, Calif. In various embodiments, one or more components of system 600 may be implemented on the same circuit die and in the same package. For example, control circuitry 128 and memory 102 may be implemented on the same circuit die. In some embodiments, they may be implemented on different dies and in different packages.

In various embodiments, communications interface 611 may be configured to send and receive data to other system components, or may be configured to send and receive packets or data segments over a network. For example, communications interface 611 may be communicatively coupled to a user interface device via a bus, such as bus 615, or via a communications network. As discussed above, communications interface 611 may be configured to receive data from such a user interface device which may be included in a data processing system or computer system. In various embodiments, such data may include an input identifying wear leveling parameters from a user. In various embodiments, communications interface 611 may be a device that supports Ethernet interfaces, frame relay interfaces, cable interfaces, and DSL interfaces. In addition, various very high-speed interfaces may be provided such as fast Ethernet interfaces, Gigabit Ethernet interfaces, HSSI interfaces, POS interfaces, FDDI interfaces and the like. Generally, these interfaces may include ports appropriate for communication with the appropriate media. In some cases, they may also include an independent processor and, in some instances, volatile RAM.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A device comprising:
a non-volatile memory comprising a plurality of physical memory portions, wherein each of the plurality of physical memory portions is configured to be mapped to a logical memory portion of a plurality of logical memory portions; and
wear leveling control circuitry configured to receive a plurality of wear leveling parameters determined based on a user input, wherein a size and an address range of each of a plurality of logical memory partitions are user specified via user-defined address pointers, wherein each of the plurality of logical memory partitions has one or more boundaries that are user-defined, wherein each of the plurality of logical memory portions is assigned to one of the plurality of logical memory partitions by a user, and wherein a wear leveling parameter is specified by the user for each of the address ranges identified by the address pointers,
the wear leveling control circuitry being further configured to determine and apply, to the non-volatile memory, a plurality of wear leveling characteristics based on the plurality of wear leveling parameters received, wherein the plurality of wear leveling characteristics identify an amount of wear leveling allowed for each of the plurality of logical memory portions, and further identify whether one or more of the plurality of logical memory portions should be excluded from wear leveling, and wherein the wear leveling control circuitry is configured to update a supervisory memory sector of the non-volatile memory to store a user-defined partition mapping that identifies logical memory portions and their associated wear leveling parameters, wherein the supervisory memory sector is a dedicated storage location in the non-volatile memory.

2. The device of claim 1, wherein the plurality of wear leveling parameters is configured to further identify portions of the non-volatile memory allocated to each of the plurality of wear leveling characteristics.

3. The device of claim 1, wherein the plurality of wear leveling characteristics comprises a first wear leveling setting indicating wear leveling should be applied, and further comprises a second wear leveling setting indicating wear leveling should not be applied.

4. The device of claim 3, wherein the first wear leveling setting indicates a first amount of wear leveling should be applied, and wherein the plurality of wear leveling characteristics further comprises:
a third wear leveling setting indicating a second amount of wear leveling should be applied; and
a fourth wear leveling setting indicating a third amount of wear leveling should be applied.

5. The device of claim 1, wherein the plurality of wear leveling parameters identifies a number of program and erase (PE) cycles associated with each of the plurality of logical memory portions, and wherein the plurality of wear leveling characteristics identify an amount of wear leveling applied to each of the plurality of logical memory portions based on the number of PE cycles.

6. The device of claim 1, wherein the plurality of wear leveling parameters identifies a logical size of each partition of a plurality of partitions of the non-volatile memory, and wherein the plurality of wear leveling characteristics identify an amount of wear leveling allowed for each of the plurality of logical memory portions based on the size of each logical portion.

7. The device of claim 1, wherein the plurality of logical memory portions is partitioned into a plurality of fixed size partitions.

8. The device of claim 1, wherein the plurality of logical memory portions is partitioned into a plurality of flexible size partitions configured based on the plurality of wear leveling parameters.

9. A system comprising:
a non-volatile memory comprising a plurality of physical memory portions, wherein each of the plurality of physical memory portions is configured to be mapped to a logical memory portion of a plurality of logical memory portions;
wear leveling control circuitry configured to receive a plurality of wear leveling parameters determined based on a user input, wherein a size and an address range of each of a plurality of logical memory partitions are user specified via user-defined address pointers, wherein each of the plurality of logical memory partitions has one or more boundaries that are user-defined, wherein each of the plurality of logical memory portions is assigned to one of the plurality of logical memory partitions by a user, and wherein a wear leveling parameter is specified by the user for each of the address ranges identified by the address pointers, the wear leveling control circuitry being further configured to determine and apply, to the non-volatile memory, a plurality of wear leveling characteristics based on the plurality of wear leveling parameters received, wherein the plurality of wear leveling characteristics identify an amount of wear leveling allowed for each of the plurality of logical memory portions, and further identify whether one or more of the plurality of logical memory portions should be excluded from wear leveling, and wherein the wear leveling control circuitry is configured to update a supervisory memory sector of the non-volatile memory to store a user-defined partition mapping that identifies logical memory portions and their associated wear leveling parameters, wherein the supervisory memory sector is a dedicated storage location in the non-volatile memory;
a communications interface configured to communicatively couple the wear leveling control circuitry with a data processing system; and
one or more processors configured to execute program and erase operations associated with the non-volatile memory.

10. The system of claim 9, wherein the plurality of wear leveling parameters is configured to further identify portions of the non-volatile memory allocated to each of the plurality of wear leveling characteristics.

11. The system of claim 9, wherein the plurality of wear leveling characteristics comprises a first wear leveling setting indicating wear leveling should be applied, and further comprises a second wear leveling setting indicating wear leveling should not be applied.

12. The system of claim 9, wherein the plurality of wear leveling parameters identifies a number of program and erase (PE) cycles associated with each of the plurality of logical memory portions, and wherein the plurality of wear leveling characteristics identify an amount of wear leveling applied to each of the plurality of logical memory portions based on the number of PE cycles.

13. The system of claim 9, wherein the plurality of logical memory portions is partitioned into a plurality of flexible size partitions configured based on the plurality of wear leveling parameters, and wherein the non-volatile memory and the wear leveling control circuitry are implemented on a same circuit die.

14. A method comprising:
generating, using wear leveling control circuitry, a plurality of partition boundary identifiers characterizing a plurality of logical address ranges associated with a plurality of partitions of a non-volatile memory comprising a plurality of physical memory portions, each of the plurality of physical memory portions being associated with a logical memory portion of a plurality of logical memory portions, wherein the plurality of partition boundary identifiers is specified by user-defined address pointers such that each of the partition boundary identifiers is user-defined, and wherein each of the plurality of logical memory portions is assigned to one of the plurality of logical memory partitions by a user;
generating, using the wear leveling control circuitry, a plurality of wear leveling identifiers associated with the plurality of partitions and the address ranges identified by the address pointers the wear leveling identifiers comprising wear leveling characteristics associated with the plurality of logical memory portions, the plurality of wear leveling characteristics identifying an amount of wear leveling allowed for each of the plurality of logical memory portions, and further identifying whether one or more of the plurality of logical memory portions should be excluded from wear leveling, wherein the plurality of wear leveling identifiers are, at least in part, user specified;
generating, using the wear leveling control circuitry, an address map based, at least in part, on the plurality of wear leveling identifiers, the address map characterizing a first mapping of a first plurality of logical memory portions to a first plurality of physical memory portions included in wear leveling, and the address mapping further characterizing a second map of a second plurality of logical memory portions to a second plurality of physical memory portions excluded from wear leveling, the wear leveling identifiers and the address map being stored in a supervisory memory sector, wherein the supervisory memory sector is a dedicated storage location in the non-volatile memory; and
executing, based on the address map, one or more program and erase operations associated with the non-volatile memory.

15. The method of claim 14, wherein the plurality of wear leveling identifiers further identifies portions of the non-volatile memory allocated to each of the plurality of wear leveling characteristics.

16. The method of claim 14, wherein the plurality of wear leveling characteristics comprises a first wear leveling setting indicating wear leveling should be applied, and further comprises a second wear leveling setting indicating wear leveling should not be applied.

17. The method of claim 14, wherein the plurality of wear leveling identifiers identifies a logical size of each partition of a plurality of partitions of the non-volatile memory, and wherein the plurality of wear leveling characteristics identify an amount of wear leveling allowed for each of the plurality of logical memory portions based on the size of each logical portion.

* * * * *